Sept. 22, 1931.  S. G. DOWN  1,824,039
VARIABLE LOAD BRAKE
Filed April 20, 1929
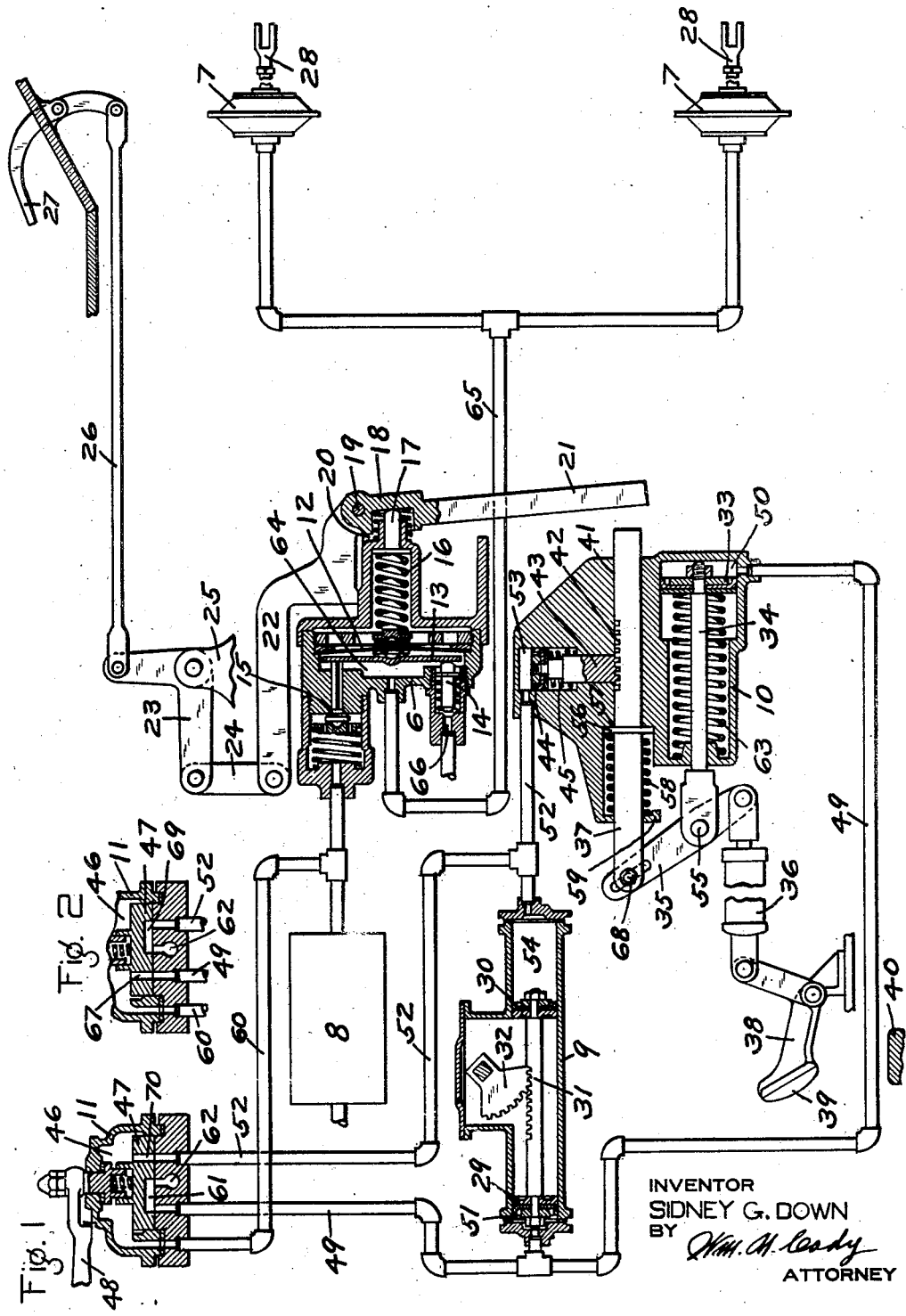
INVENTOR
SIDNEY G. DOWN
BY
Wm. M. Cady
ATTORNEY Patented Sept. 22, 1931

1,824,039

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

VARIABLE LOAD BRAKE

Application filed April 20, 1929. Serial No. 356,829.

This invention relates to brakes, and more particularly to fluid pressure actuated brake equipment for automative vehicle.

An object of the invention is to provide a variable load brake equipment for automotive vehicles of the type in which the vehicle body is provided with doors which are opened and closed by fluid pressure controlled mechanism.

Another object of the invention is to provide improved means for regulating the maximum fluid pressure in an automotive vehicle fluid pressure brake equipment according to variations of the load on the vehicle.

Another object of the invention is to provide an improved variable load brake equipment of the character mentioned in which the maximum brake chamber pressure is governed by means which are adjusted according to an increase or decrease in load on the vehicle when the vehicle doors are open.

Another object of the invention is to provide a variable load brake equipment especially adapted to be incorporated with the fluid pressure operated door opening and closing mechanism of automotive vehicles so that when the doors of the vehicle are open the brake mechanism will be adjusted by a variation in the load on the vehicle so as to proportionately vary the maximum pressure limit available for use in applying the brakes.

Another object of the invention is to provide an improved variable load brake equipment of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings: Figure 1 is a diagrammatic view, mostly in section, of a load brake equipment embodying the invention, the equipment being shown in running position; and Fig. 2 is a section of a portion of the door mechanism control valve, showing the valve in door open position.

When an automotive vehicle is provided with a body having doors which are opened and closed by means of fluid pressure operated mechanism, the load on the vehicle may be changed when the vehicle is not in motion and its doors are open. Such vehicles may be of the type used for carrying passengers, or they may be of the type in which the body is designed to receive merchandise, and the size of the vehicle is such that it is of advantage to employ fluid pressure brake apparatus. The brake apparatus usually employed with vehicles of the character mentioned may include a lap type brake valve for controlling the flow of fluid under pressure to or from the brake chambers. The construction of the brake valve is such that a given movement of the brake pedal causes a corresponding fluid pressure increase or decrease in the brake chambers.

It is obvious that under these conditions it is necessary for the vehicle operator to exercise judgment as to the maximum pressure which should be built up in the brake chambers for braking purposes, this judgment being based primarily on the load on the vehicle. When the load on the vehicle is increased, the brake chamber fluid pressure should also be proportionately increased so as to increase the braking force.

The lap type brake valve may be provided with a flexible member subject on one side to the pressure of a spring and on the opposite side to the brake chamber fluid pressure. The flexible member is adapted to operate a fluid supply valve and an exhaust valve. When the pressure on the spring side of the flexible member is less than the pressure on the valve side of said member, the supply valve is closed and the exhaust valve is open. However, when the spring pressure is increased, the flexible member is moved to unseat the supply valve and seat the exhaust valve. When the supply valve is thus unseated, fluid under pressure is supplied to the brake chambers until the brake chamber pressure overbalances the spring pressure, whereupon the flexible member is moved by the fluid pressure in a direction away from the supply valve, thereby permitting said supply valve to seat. Since the exhaust valve remains seated, the fluid under pressure in the brake chambers is bottled up, and the brakes are held applied.

Heretofore, the brake valve device could be manipulated to supply fluid to the brake chamber up to the maximum pressure of fluid available according to the degree to which the spring was compressed, regardless of whether the vehicle was loaded or unloaded, but according to the present invention, means are provided for limiting the degree to which the spring may be compressed, as the load on the vehicle is varied.

Obviously, if the degree to which the valve spring may be compressed is increased in proportion as the load is increased, then it will require a corresponding increase in brake chamber pressure to overbalance the spring pressure, and accordingly the maximum pressure of brake chamber fluid is also increased.

For the purpose of regulating the compression of the brake valve spring, an abutment member is provided for limiting the movement of the spring compressing member.

The positioning of the abutment member in accordance with variations of the load on the vehicle is effected through a system of levers, which may be thrown into and out of operative relation, by the operation of a fluid pressure piston which is actuated when the door operating mechanism is actuated so that the lever system may be maintained in its inactive position while the vehicle is running and thus prevent the abutment from being acted upon by the load on the vehicle except when the vehicle is stopped and the doors are open. In order to lock the abutment member so that it will remain in its adjusted position while the vehicle is running, a locking device is provided.

Referring to the drawings, the equipment may comprise a valve device 6 for controlling the supply of fluid under pressure to, and the release of fluid from one or more brake chambers 7; a main reservoir 8; a door controlling motor 9; a strut cylinder 10; and a valve device 11 for controlling the supply of fluid under pressure to, and the release of fluid from the door controlling motor 9 and the strut cylinder 10.

The valve device 6 may comprise a casing having a diaphragm chamber containing a flexible diaphragm 12. The diaphragm 12 carries a member 13 which engages the stem of an exhaust valve 14 and the stem of a supply valve 15, for controlling said valves upon movement of the diaphragm.

A spring 16 acts on the opposite side of the diaphragm 12 and engages a spring pin 17 which in turn engages a lever 18.

The lever 18 is fulcrumed on a pin 19 carried by a bracket 20 extending from the casing 6. The lever 18 may be in the form of a bell crank having a free arm 21 and another arm 22 connected by means of a link 24 to one arm of a bell crank 23.

The lever 23 is fulcrumed to a bracket 25 carried by the vehicle, and the end of the other arm of the lever 23 is connected to a rod 26, which in turn is connected to a foot pedal 27 pivotally mounted on the vehicle.

Each brake chamber 7 may contain a flexible diaphragm (not shown) adapted to be operated by fluid under pressure for projecting a push rod 28 connected to the rigging (not shown) through which the brakes of the automotive vehicle are applied and released.

The door motor or engine 9 may comprise a cylinder containing pistons 29 and 30, connected together by a rack bar 31 which meshes with a gear 32 for operating the doors of the vehicle.

The strut cylinder 10 contains a piston 33, piston rod 34 of which is pivotally connected by a pin 55 to a lever 35.

One end of lever 35 is pivotally connected to a link 36 and the other end of said lever is connected to a bar 37.

Pivotally connected to the outer end of the link 36 is a bell crank 38 which is pivotally mounted on the vehicle body. The free arm of the bell crank 38 is provided with a member 39 adapted to engage a knife edge member 40 which is mounted at a convenient location on the vehicle axle housing.

The bar 37 is slidably mounted in an opening 41 extending through the casing of the strut cylinder 10. Intermediate its length, the bar 37 is enlarged as at 56, to provide means adapted to engage a shoulder 57 in the casing so as to limit the movement of the bar in one direction. An expansible coil spring 58 encircles the bar 37 and bears at one end against the portion 56 and at the opposite end against a member 59, carried by the strut cylinder casing, thereby urging the portion 56 against the stop 57. In this position the free end of the bar 37 projects a suitable distance beyond the end wall of the casing towards the end portion of the arm 21 of the lever 18, for a purpose to be hereinafter described.

A portion of the bar 37 is formed with teeth 42 which are engageable by the correspondingly formed teeth of a pawl 43 which is connected to a piston 44, subject on one side to the pressure of a spring 45.

The valve device 11 may comprise a casing, having a valve chamber 46, containing a rotary valve 47, adapted to be operated by a handle 48.

A pipe 49 leads from piston chamber 50, adjacent to the piston 33 and from piston chamber 51, adjacent to the piston 29, to the seat of the rotary valve 47, and a pipe 52 leads from piston chamber 53 of the piston 44 and from piston chamber 54, adjacent to piston 30, to the seat of valve 47.

In operation, when a vehicle equipped with the above described variable load brake apparatus is running along the road with all the vehicle doors closed, as shown in the drawings, the rotary valve 47 will be in the position shown in Fig. 1, in which communication is open for supplying fluid under pressure from the main reservoir 8, through pipe 60, valve chamber 46, port 70, and pipe 52 to chamber 54 of the door motor 9 and to chamber 53 respectively. The piston 44 is therefore operated to hold the pawl 43 in engagement with the teeth 42 of the bar 37, and piston 30 is operated to position the piston 29 adjacent the left hand end of the door motor 9.

When the rotary valve 47 is in the door closed position shown in Fig. 1, chamber 50 is vented to the atmosphere through pipe 49, cavity 61 in rotary valve 47, and atmospheric exhaust port 62. Spring 63 then acts to hold piston 33 in its retracted position so that the member 39 does not engage the knife edge 40. Movement of the vehicle body relative to the vehicle axles will not be transmitted to the variable load brake mechanism while the vehicle is running.

When the vehicle is unloaded, the projecting end of the bar 37 is so positioned relative to the arm 21 of the lever 18, that sufficient movement of the lever 18 can be obtained to produce the maximum brake chamber pressure for properly applying the brakes with the desired pressure maximum for an unloaded vehicle.

It will be understood, however, that this brake chamber pressure is considerably less than the maximum amount of pressure necessary to effect an application of the brakes when the vehicle is heavily loaded. Therefore, one of the features of the present invention is the provision of the means for causing the bar 37 to shift relatively to the arm 21 of the lever 18 so as to permit an increased movement of said lever so as to proportionately increase the brake chamber pressure when the vehicle load is increased, and conversely, to decrease the movement of said lever proportionately to decreases in the vehicle load, so as to reduce the maximum brake chamber pressure proportionately to the reductions in the vehicle load.

When it is desired to apply the brakes, the foot pedal 27 is depressed by the operator in the usual manner, causing a forward movement of the rod 26. In this forward movement of the rod 26, the lever 23, through the link 24, will lift the arm 22 of the lever 18, and the arm 21 of the lever depresses the pin 14, compressing the spring 16.

The diaphragm 12 is then operated by the pressure of spring 16 to close the exhaust valve 14 and open the supply valve 15.

Fluid under pressure from reservoir 8 is then admitted to diaphragm chamber 64 and from thence flows through pipe 65 to the brake chambers 7. The diaphragm in each brake chamber is thereupon operated to project the push rods 28 in the usual manner to effect the application of the brakes.

When the pressure of the fluid in diaphragm chamber 64 increases a predetermined amount, the diaphragm 12 will be flexed outwardly against the pressure exerted by spring 16. When the pressure of the fluid in the brake chambers 7 and diaphragm chamber 64 increases an amount sufficient to overbalance the pressure of spring 16, the fluid under pressure in chamber 64, acting on the diaphragm 12, will flex said diaphragm outwardly an amount sufficient to permit the supply valve 15 to seat, thereby cutting off the supply of fluid under pressure from the reservoir 8.

The pedal 27 may be further depressed to further compress the spring 16, so as to operate the diaphragm 12, and thereby cause fluid under pressure to be again supplied to the brake chambers 7 in the manner hereinbefore described, and this process may be repeated until the arm 21 engages the end of the rod 37, when no further compression of the spring 16 can be effected, since the pedal 27 is thereby prevented from moving so as to further compress the spring. When the pressure in chamber 64 acting on the diaphragm 12 slightly exceeds the opposing pressure of the spring 16 thus permitted according to the load, the diaphragm 12 will be moved toward the right, so as to permit the supply valve 15 to be closed by its spring. Since the pressure of the spring of the valve 15 is greater than the pressure of the spring of the exhaust valve 14, the pressure of the spring of the supply valve 15 will act on the member 13 so as to tilt said member with the stem of the valve 15 acting as a fulcrum and the exhaust valve 14 will be held seated during the movement of the diaphragm 12 toward the right. It will now be seen that both the supply valve 15 and the exhaust valve 14 are closed or lapped and the parts will remain in this position as long as the pressure in the brake chambers 7 corresponds with the pressure to which the spring 16 is set.

The brakes may be released by relieving the foot pressure on the pedal 27 so that the compression of spring 16 being reduced, the diaphragm 12 will be moved by the brake chamber pressure acting on the opposite side to open the exhaust valve 14 and thereby permit the exhaust of fluid from the brake chambers 7 through the open exhaust port 66.

When the vehicle is brought to a stop, if it is desired to open the doors, the handle 48 of the valve device 11 is turned to door open position, as shown in Fig. 2 of the drawings, so that fluid under pressure is supplied from the rotary valve chamber 46 and the reservoir 8 through port 67 and thence flows to piston chamber 51 of the door motor 9, operating the pistons 29 and 30 and the gear 32 so as to open the vehicle doors.

When the handle 48 is turned to the door open position heretofore referred to, the supply of fluid under pressure from the reservoir 8 and valve chamber 46 through pipe 52 to piston chambers 53 and 54 is cut off, and communication is established through cavity 69 in the rotary valve 47, in which the fluid under pressure in said piston chambers is vented to the atmosphere through exhaust port 62, as shown in Fig. 2.

The venting of the fluid from piston chamber 53 permits the spring 45 to shift the piston 44 outwardly, thus releasing the pawl 43 from engagement with the teeth 42 of the bar 37, so that said bar is free to slide.

When the piston 33 is shifted by the fluid under pressure admitted to chamber 50, the pivot pin 68 acts as the fulcrum of lever 35 and the bell crank is operated so as to bring the member 39 into engagement with the knife edge 40.

If the load on the vehicle is now increased, the downward movement of the vehicle body, which carries the bell crank 38, relative to the vehicle axles, causes a clock-wise movement of the bell crank 38 so that pressure is exerted through the strut 36 to turn the lever 35 in a counter clock-wise direction, on the fulcrum provided by pin 55. In this way the bar 37 is moved to the left to a position corresponding with the adjusted position of the bell crank 38.

The doors may be closed by turning the handle 48 to the position shown in Fig. 1, in which the pipe 49 is connected through cavity 61 to the atmospheric exhaust port 62, so that fluid in the piston chambers 50 and 51 is released, while fluid is supplied through the rotary valve port 70 to pipe 52 and piston chambers 53 and 54 for operating the piston 44 so as to move the pawl 43 into engagement with the teeth 42 of the bar 37 and for moving the piston 30 and the gear 32 so as to close the vehicle doors.

In this way, when the load on the vehicle is increased, the distance between the end of the bar 37 and the face of the lever arm 21 will also be increased so as to permit greater movement of the lever 18, when the brake pedal 27 is depressed in the manner heretofore described, and therefore the spring 16 will be proportionately compressed a greater extent. With the compression of the spring 16 thus increased, it will require a greater increase in fluid pressure in the chamber 64, when the valve mechanism 6 is actuated to supply fluid to the brake chambers 7, to flex the diaphragm 12 outwardly in the manner heretofore described, in which the supply of fluid under pressure from the reservoir 8 to the brake chambers is cut off.

It will thus be seen that the maximum pressure of fluid supplied to apply the brakes is limited according to the load on the vehicle, the maximum pressure limit being varied as the load on the vehicle is varied.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a load regulated brake for vehicles, the combination with a brake chamber, valve means subject on one side to the pressure of a spring and on the opposite side to fluid pressure, for regulating the fluid under pressure supplied to the brake chamber, means for compressing said spring to operate the valve means so as to supply fluid under pressure to the brake chamber, and means for limiting the compression of said valve spring according to the load on the vehicle.

2. In a load regulated brake for vehicles, the combination with a brake chamber, of valve means subject on one side of the pressure of a spring and on the opposite side to fluid pressure, for regulating the fluid under pressure supplied to the brake chamber, a bell crank lever for compressing said spring to operate said valve means so as to supply fluid under pressure to the brake chamber, means connected to one arm of said bell crank lever for operating the same, and means disposed in the path of movement of the other bell crank lever arm for limiting the movement thereof in the direction by which said spring is compressed.

3. In a load regulated brake for vehicles, the combination with a brake chamber, of valve means subject on one side to the pressure of a spring and on the opposite side to fluid pressure, for regulating the fluid under pressure supplied to the brake chamber, a bell crank lever for compressing said spring to operate said valve means so as to supply fluid under pressure to the brake chamber, means for actuating the bell crank lever, and means for limiting the movement of the bell crank lever according to the load on the vehicle.

4. In a load regulated brake for vehicles, the combination with a brake chamber, of valve means subject on one side to the pressure of a spring and on the opposite side to fluid pressure, for regulating the fluid under pressure supplied to the brake chamber, a bell crank lever for compressing said spring to operate said valve means so as to supply fluid under pressure to the brake chamber, means for actuating the lever, means for limiting the movement of the lever against the spring, and means for shifting the position of said lever limiting means when the load on the vehicle is altered.

5. In a load regulated brake for vehicles, the combination with a brake chamber, of valve means for regulating the fluid under pressure supplied to the brake chamber, said valve means being subject on one side to the pressure of a spring and on the opposite side to brake chamber fluid pressure, means for compressing the spring, a stop for limiting the movement of said spring compressing means, and means for positioning said stop according to the load on the vehicle.

6. In a load brake apparatus, the combination with a brake chamber, a fluid pressure reservoir, of valve mechanism for controlling the supply of fluid under pressure to and the release of fluid from the brake chamber, a bell crank lever for actuating said valve mechanism, means connected to one arm of said bell crank lever for manually operating the same, and means disposed in the path of movement of the other bell crank lever arm for limiting the movement thereof in a direction in which said valve mechanism is operated to supply fluid under pressure from the reservoir to said brake chamber.

7. In a load brake apparatus, the combination with a brake chamber, a fluid pressure reservoir, valve means for controlling the fluid supplied to the brake chamber from the reservoir, said valve means being subject on one side to the pressure of a spring, a lever for compressing the spring, actuating means connected to one arm of the lever, means disposed in the path of the lever for limiting the movement thereof toward the spring, and means for shifting the position of said limiting means according to the load.

8. In a load regulated brake for vehicles, the combination with a brake chamber, of valve means subject on one side to the pressure of a spring and on the opposite side to fluid pressure, for regulating the fluid under pressure supplied to the brake chamber, said valve means being actuated when the brake chamber pressure overbalances the pressure of the spring to cut off the supply of fluid to the brake chamber, a member for compressing the spring, means for actuating the member, a stop for limiting the movement of said member toward the spring whereby the maximum braking force is obtained, and means for varying the position of said stop according to the load on the vehicle so that the maximum braking force is varied according to variations in the vehicle load.

9. In a load regulated brake, the combination with a brake chamber, of valve means subject on one side to the pressure of a spring, a bell crank for compressing the spring an amount in proportion to the load, means for actuating the lever, means for limiting the movement of the lever toward the spring, and means for changing the position of said lever limiting means when the load is changed.

10. In a vehicle brake equipment, the combination with means for varying the braking power in proportion to the pressure applied thereto, and a manually operated member for varying the pressure applied to said means, of means for controlling the movement of said member to vary the pressure applied according to the load on the vehicle.

11. In a vehicle brake equipment, the combination with means for varying the braking power in proportion to the pressure applied thereto, a spring for applying pressure to said means, and a manually operated member for compressing said spring, of a stop for limiting the movement of said member, and means controlled by the load on the vehicle for operating said stop.

12. In a load brake apparatus for vehicles, the combination with a brake chamber, of valve mechanism comprising means subject to the opposing pressures of said brake chamber and a spring for regulating the maximum braking force of the fluid in the brake chamber, manually operated means for compressing said spring, and means for limiting the movement of said spring compressing means according to the load on the vehicle.

13. In a load regulated brake for vehicles, the combination with a brake chamber, of valve means for regulating the fluid under pressure supplied to the brake chamber, said valve means being subject on one side to the pressure of a spring and on the opposite side to brake chamber fluid pressure, a manually operated member for compressing the spring, and means for varying the maximum movement of the member so as to correspondingly vary the maximum compression of said spring according to the load on the vehicle.

14. In a load regulated brake, the combination with a brake chamber, of valve means subject on one side to the pressure of a spring, for regulating the fluid under pressure supplied to the brake chamber, a bell crank lever for compressing the spring, manually operated means for operating said lever, and means for varying the movement of said lever so as to correspondingly vary the compression of said spring according to the load.

15. In a load regulated brake for vehicles, the combination with a brake chamber, valve means subject on one side to the pressure of a spring and on the opposite side to fluid pressure, for regulating the fluid under pressure supplied to the brake chamber, means for compressing said spring to operate the valve means so as to supply fluid under pressure to the brake chamber, and fluid pressure operated means for limiting the compression of said spring according to the load on the vehicle.

16. In a load regulated brake for vehicles, the combination with a brake chamber, valve means subject on one side to the pressure of a spring and on the opposite side to fluid pressure, for regulating the fluid under pressure supplied to the brake chamber, manually operated means for compressing said spring to operate the valve means so as to supply fluid under pressure to the brake chamber, and means for limiting the movement of said manually operated means according to the load on the vehicle.

17. In a load regulated brake for vehicles, the combination with a brake chamber, valve means subject on one side to the pressure of a spring and on the opposite side to fluid pressure, for regulating the fluid under pressure supplied to the brake chamber, manually operated means for compressing said spring to operate the valve means so as to supply fluid under pressure to the brake chamber, and fluid pressure operated means for limiting the compression of said spring according to the load on the vehicle.

In testimony whereof I have hereunto set my hand, this 17th day of April, 1929.

SIDNEY G. DOWN.